R. D. BELL.
STRAW STACKER FOR THRESHING MACHINES.
APPLICATION FILED NOV. 17, 1909.
1,258,858.
Patented Mar. 12, 1918.
2 SHEETS—SHEET 1.
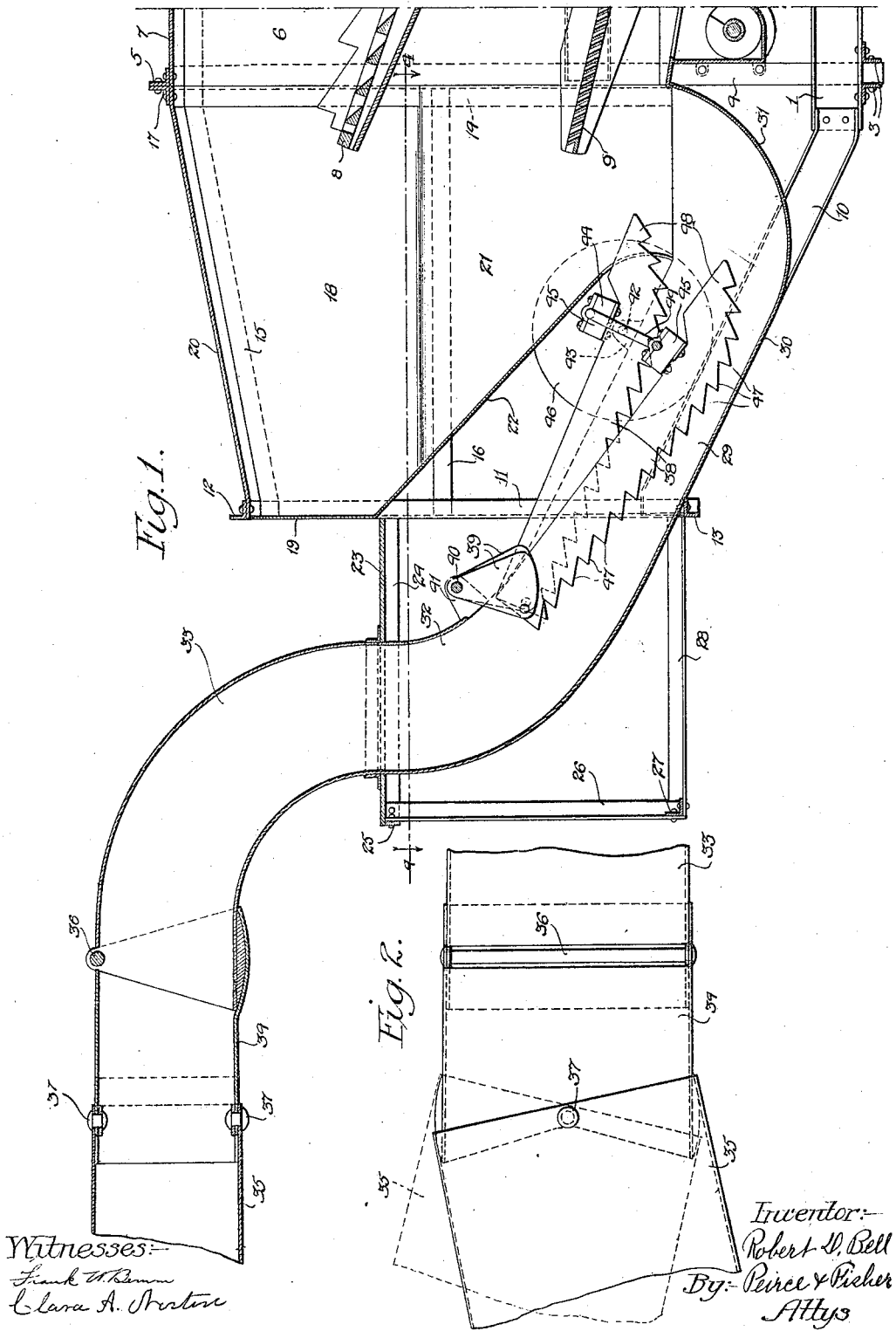

R. D. BELL.
STRAW STACKER FOR THRESHING MACHINES.
APPLICATION FILED NOV. 17, 1909.

1,258,858.

Patented Mar. 12, 1918.
2 SHEETS—SHEET 2.

Witnesses:—
Frank W. Bemun
Clara A. Norton

Inventor:-
Robert D. Bell
By: Peirce & Fisher
Attys.

UNITED STATES PATENT OFFICE.

ROBERT D. BELL, OF RACINE, WISCONSIN, ASSIGNOR TO J. I. CASE THRESHING MACHINE COMPANY, OF RACINE, WISCONSIN, A CORPORATION.

STRAW-STACKER FOR THRESHING-MACHINES.

1,258,858.      Specification of Letters Patent.      Patented Mar. 12, 1918.

Application filed November 17, 1909. Serial No. 528,527.

*To all whom it may concern:*

Be it known that I, ROBERT D. BELL, a citizen of the United States, and a resident of Racine, county of Racine, and State of Wisconsin, have invented certain new and useful Improvements in Straw-Stackers for Threshing-Machines, of which the following is a specification.

The invention relates to straw stackers for threshing machines and seeks to provide an improved force feed stacker of simple, compact construction in which the straw and chaff from the threshing machine is received in a hopper having converging side walls, and is forced from the contracted, lower end thereof through a closed discharge pipe by a series of mechanically operated feeders, thereby obviating the disadvantages attendant upon the use of an air blast.

The invention consists in the features of improvement hereinafter set forth, illustrated in the preferred form in the accompanying drawings and more particularly pointed out in the appended claims.

Figure 4:
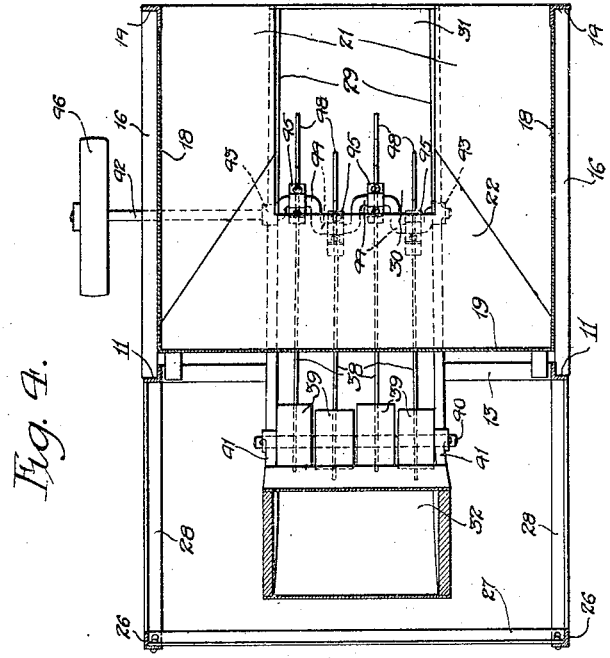
Figure 5:
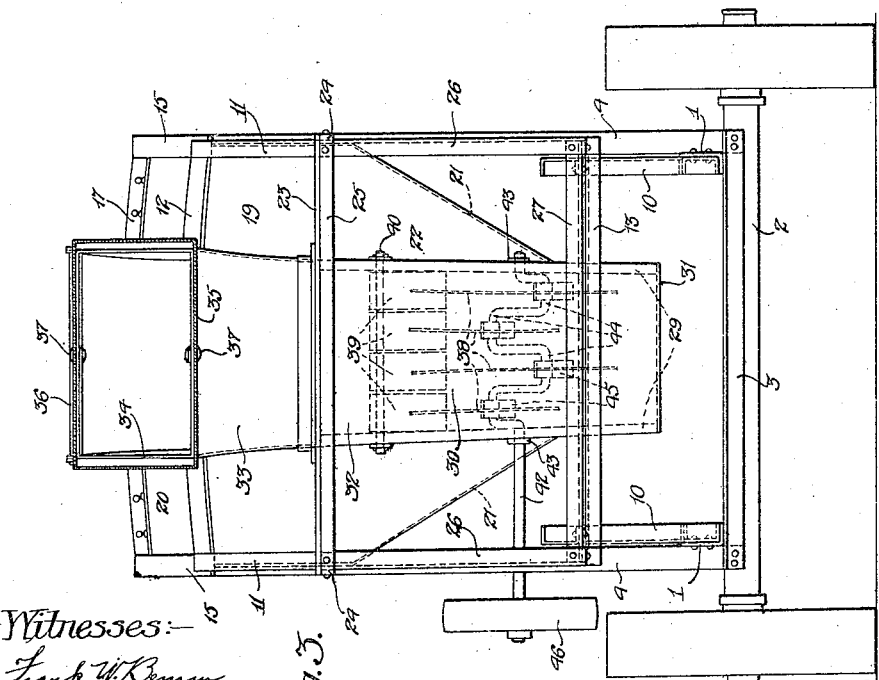

In the drawings, Figure 1 is a longitudinal section of the improved stacker shown attached to the rear end of a threshing machine. Fig. 2 is a plan view of a portion of the delivery pipe of the stacker. Fig. 3 is a rear end view of the parts shown in Fig. 1 with the delivery pipe shown in section. Fig. 4 is a plan section on the line 4—4 of Fig. 1.

The rear ends of the sills 1 of the threshing machine are illustrated in the drawings. These sills rest upon the rear axle 2 and are connected by transverse angle bars 3. The rear uprights 4 of the threshing machine rise from the sills 1 and are connected at their upper ends by a transverse angle bar 5. The threshing machine is provided with the inclosing side walls 6 and roof or deck 7, and the rear ends of the straw rack 8 and sieve 9 project through the open rear end of the machine.

The improved stacker is adapted to be attached at the open rear end of the threshing machine and receive the straw and chaff from the racks and sieves thereof. The stacker frame comprises upwardly inclined sills 10 which are secured at their lower front ends to the rear ends of the sills 1 of the threshing machine. Rear uprights 11 extend upwardly from the rear ends of the sills 10 and are connected at their upper and lower ends by transverse angle bars 12 and 13. Front uprights 14 are connected to the rear uprights 11, by upper and lower side bars 15 and 16 and at their upper ends are connected together by a transverse angle bar 17. The uprights 14 and transverse angle bar 17 of the stacker frame are connected respectively to the uprights 4 and transverse deck bar 5 of the frame of the threshing machine. The upper portion of the stacker frame is provided with inclosing side walls 18, a rear wall 19 and an inclined top wall or roof 20. Within the lower portion of the stacker casing is arranged a hopper formed of converging side and rear walls 21 and 22. At the upper rear portion of the stacker casing is arranged a horizontal platform 23 which is supported by frame bars 24 extending rearwardly from the uprights 11 and connected at their rear ends by a cross bar 25. The rear portion of the platform is supported by a pair of uprights 26 connected at their lower ends by an angle bar 27, and to the rear ends of a pair of bars 28 extending rearwardly from the lower ends of the uprights 11.

The improved stacker is provided with a closed delivery pipe through which the straw and chaff from the hopper is forced by a set of mechanical feeding devices. The closed pipe preferably communicates with the lower contracted portion of the hopper through the medium of an open-topped trough. The trough and delivery pipe are preferably rectangular in section and the trough comprises side walls 29 and a bottom wall 30. The lower front ends of the side walls 29 are arranged in line with the lower edges of the side walls 21 of the hopper, and the front ends of these side walls and the upwardly curved front end portion 31 of the bottom wall 30 form, in effect, the bottom portion of the hopper, which receives the straw and chaff from the racks and sieves of the threshing machine.

The trough is suitably supported in position within the stacker frame and its bottom wall rests, as shown, upon the transverse angle bar 13. The trough is rearwardly and upwardly inclined from the lower contracted end of the hopper and terminates in the closed delivery pipe, which, in the form shown, is of rectangular section and comprises an upturned elbow portion 32, which projects through and is supported by the platform 23 and a reversely turned elbow 33.

The closed delivery pipe may be provided with suitable, laterally and vertically swinging devices for delivering the straw to the stack. The delivery pipe may be closed throughout its length and provided with a vertically swinging section 34 and a horizontally swinging section 35. In the form shown, the inner end of the section 34 is connected at its upper portion to the outer end of the elbow 33 by a transverse pivot bolt 36, and the section 35 is connected at its inner end to the section 34 by a pair of pivots or studs 37 extending through the top and bottom walls of the sections 34 and 35, midway between the side walls thereof.

A series of longitudinally extending feeder arms 38 are arranged within the trough at the inlet end of the closed discharge pipe. In the form shown, there are four of these feeders which are pivotally connected at their upper rear ends to the lower ends of a series of hangers 39. These hangers are pivotally mounted at their upper ends upon a transverse shaft or rod 40 that is mounted at its ends in lugs 41 projecting from the side walls 29 of the trough. A transverse drive shaft 42 is journaled in suitable bearings 43 upon the side walls 29 of the trough and is provided with a series of cranks 44, preferably arranged at 180° apart and engaging bearing boxes 45 fixed to the upper edges of the feeder arms 38 adjacent the lower ends thereof. A pulley 46 upon one end of the shaft 44 is driven from any suitable source of power on the threshing machine, so that the feeder arms are reciprocated and at the same time a rotary movement is imparted to their lower ends.

The feeder arms are preferably formed of thin, metal plates, vertically disposed within the trough and their lower edges are provided with a series of upwardly facing teeth 47. The rear end portions 48 of the feeder arms, beyond the bearing boxes 45, are deflected upwardly and project through a cut-away space in the wall 22 into the bottom of the receiving hopper.

In operation the straw and chaff from the racks 8 and the sieves 9 of the threshing machine drop on to the converging walls 21 and 22 of the hopper and the feeder arms pick up the straw and chaff in the lower contracted bottom portion of the hopper and force it upwardly through the trough and through the closed discharge pipe. To prevent the choking of the straw, the trough and the closed discharge pipe increase gradually in size, as indicated in the drawings, from the lower end of the hopper to the discharge end of the pipe. This arrangement permits of the forcing of the straw through the closed discharge pipe by means of the mechanically operated feeders without choking. The discharge pipe is entirely closed immediately beyond the hangers 39 and to prevent the straw from returning between the hangers they have a combined width, as shown in Fig. 4, substantially equal to the entire width of the trough or discharge pipe at this point. The hangers are also segmental in form, so that they overlap at all times as they reciprocate back and forth. By this arrangement there is no opening left between the hangers through which the straw may return or within which it may be clogged.

The construction is simple and compact, like the ordinary pneumatic stacker, but the straw is mechanically forced through the closed delivery pipe and defects attendant upon the use of an air blast are thereby obviated.

It is obvious that numerous changes may be made in the details of construction set forth without departure from the essentials of the invention, as defined in the claims.

I claim as my invention:—

1. A force feed straw stacker for threshing machines comprising a fixed hopper arranged to receive the straw and chaff from the threshing machine, a conduit having a fixed lower end upwardly and rearwardly inclined from the lower end of said hopper and terminating in a closed delivery pipe having movable sections, a series of toothed feeding devices in the lower fixed end portion only of said conduit for withdrawing the straw and chaff from said hopper and forcing the same upwardly through said closed delivery pipe, said closed pipe gradually increasing in size from its inlet to its outlet end, and means for operating said feeding devices, substantially as described.

2. A force feed straw stacker for threshing machines comprising a fixed hopper having converging walls and arranged to receive the straw from the threshing machine, a conduit having a fixed lower end upwardly inclined from the lower end of said hopper and terminating in a closed delivery pipe having movable sections, and a series of longitudinally extending, upwardly inclined toothed feeder arms in the lower fixed end of said conduit arranged to withdraw the straw from said hopper and force the same upwardly through said delivery pipe, said conduit and said delivery pipe gradually increasing in size from the lower end of said hopper to the outlet of said delivery pipe, substantially as described.

3. A force feed straw stacker for threshing machines comprising a fixed hopper having converging walls and arranged to receive the straw from the threshing machine, a conduit having a fixed lower end upwardly inclined from the lower end of said hopper and terminating in a closed delivery pipe having movable sections, and a series of longitudinally extending, upwardly inclined toothed feeder arms in the lower fixed end on said conduit arranged to withdraw the straw from said hopper and force the same upwardly through said delivery pipe, said conduit and said delivery pipe being rectangular in section and gradually increasing in size from the lower end of said hopper to the discharge end of said pipe, substantially as described.

4. A force feed straw stacker for threshing machines comprising a fixed hopper having converging side walls for receiving the straw and chaff from the threshing machine, a fixed trough leading from the contracted lower portion of said hopper and upwardly and rearwardly inclined therefrom, and terminating in a closed discharge pipe having movable sections, and a series of longitudinal arms having toothed lower edges arranged in said trough for forcing the straw and chaff from said hopper through the inlet end of said trough and closed delivery pipe.

5. A force feed straw stacker for threshing machines comprising a fixed hopper having converging side walls for receiving the straw and chaff from the threshing machine, a fixed trough leading from the contracted lower portion of said hopper and upwardly and rearwardly inclined therefrom, and terminating in a closed discharge pipe having movable sections, and a series of longitudinal arms having toothed lower edges arranged in the inlet end of said trough for forcing the straw and chaff from said hopper through said trough and closed delivery pipe, said trough and pipe gradually increasing in size from the lower end of said hopper to the outlet end of said delivery pipe.

6. A force feed straw stacker for threshing machines comprising a fixed hopper having converging side walls for receiving the straw and chaff from the threshing machine, a fixed trough leading from the contracted lower portion of said hopper and upwardly and rearwardly inclined therefrom, and terminating in a closed discharge pipe having shiftable sections, a series of longitudinal feeder arms having toothed lower edges arranged in said trough and provided with upturned lower ends extending within said hopper, a series of pivoted hangers for the upper ends of said feeder arms, and a transverse drive shaft having a series of cranks whereon the lower ends of said feeder arms are hung.

7. A force feed straw stacker for threshing machines, comprising a fixed hopper having converging side walls, a fixed trough of rectangular section upwardly inclined from the contracted lower portion of said hopper and terminating in a closed delivery pipe, a series of longitudinal feeder arms having toothed lower edges arranged in said trough for forcing the straw and chaff from said hopper through said trough and pipe, a series of pivoted hangers for the upper end of said feeder arms having a combined width substantially equal to the width of said trough, and a transverse drive shaft having a series of crank arms whereon the lower ends of said feeder arms are hung.

8. A force feed straw stacker for threshing machines, comprising a fixed hopper having converging side walls, a fixed trough of rectangular section upwardly inclined from the contracted lower portion of said hopper and terminating in a closed delivery pipe, a series of longitudinal feeder arms having toothed lower edges arranged in said trough for forcing the straw and chaff from said hopper through said trough and pipe, a series of pivoted hangers for the upper end of said feeder arms having a combined width substantially equal to the width of said trough, and a transverse drive shaft having a series of crank arms whereon the lower ends of said feeder arms are hung, said trough and pipe gradually increasing in size from said hopper to the discharge end of said delivery pipe.

ROBERT D. BELL.

Witnesses:
    FREDERICK LEE NORTON,
    ELLIS J. GITTINS.

Copies of this patent may be obtained for five cents each, by addressing the "Commissioner of Patents, Washington, D. C."